M. REICHE.
MOLD FOR CHOCOLATE, BISCUITS, SUGAR, AND THE LIKE.
APPLICATION FILED AUG. 3, 1909.
986,500.
Patented Mar. 14, 1911.
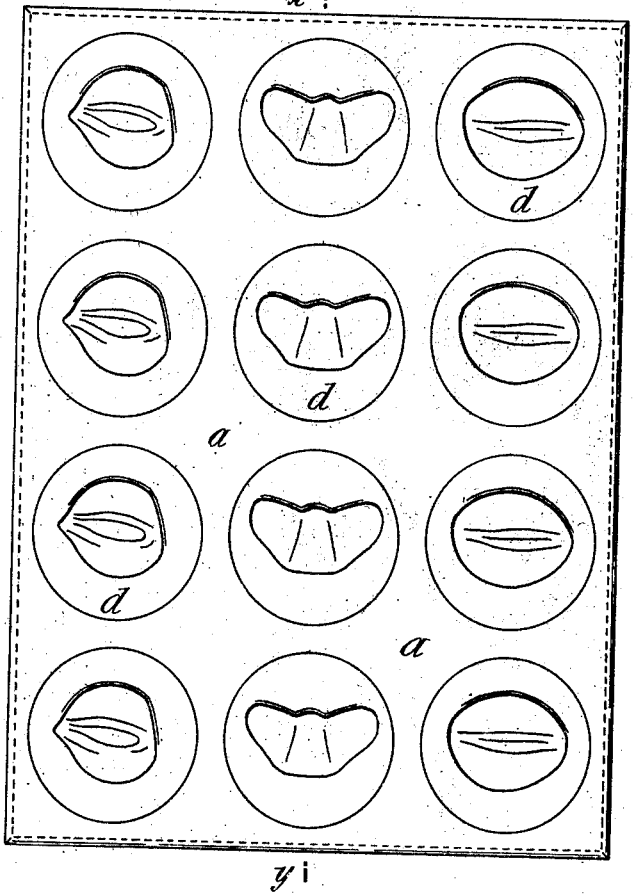
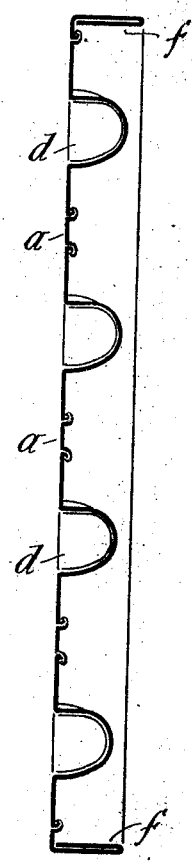
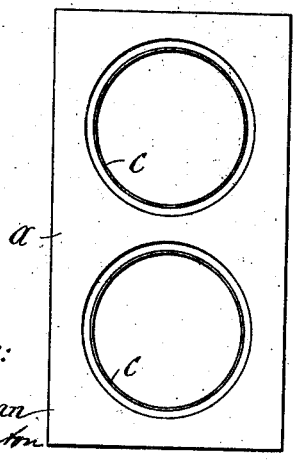
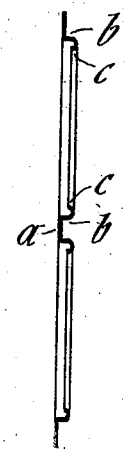
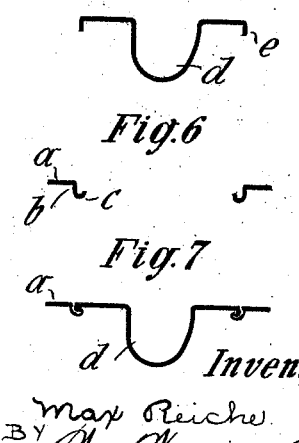
Witnesses:
Inventor:
Max Reiche
BY
Atty

UNITED STATES PATENT OFFICE.

MAX REICHE, OF DRESDEN, GERMANY, ASSIGNOR TO ANTON REICHE, OF DRESDEN, GERMANY, A FIRM.

MOLD FOR CHOCOLATE, BISCUITS, SUGAR, AND THE LIKE.

986,500.     Specification of Letters Patent.     Patented Mar. 14, 1911.

Application filed August 3, 1909. Serial No. 510,974.

*To all whom it may concern:*

Be it known that I, MAX REICHE, a subject of the King of Saxony, in the Empire of Germany, residing at Dresden, in Saxony, German Empire, have invented certain new and useful Improvements in Molds for Chocolate, Biscuits, Sugar, and the Like; and I do hereby declare the following to be a full, clear, and exact description of the invention, such as will enable others skilled in the art to which it appertains to make and use the same.

The subject-matter of my invention is an improved composite mold for chocolate, biscuits, sugar and the like.

Sheet-metal composite molds and baking-tins are already well-known which are composed of several parts in such manner that they comprise a definite number of individual molds for the articles to be made. For making such composite molds heretofore, pieces of sheet-metal were used in which either one kind of mold or a series of molds similar in size were punched or impressed beside one another. An optional number of these sheet-metal parts or strips provided with molds impressed in them was then united to form one large composite mold by folding together their straight lateral edges. In these known metal strips, however, only relatively flat patterns could be impressed beside one another, because when it was attempted to make deep impressions the sheet-metal was distorted too much or cracked; therefore in the case of deeply impressed molds individual pieces of sheet-metal had always to be employed, so that it was a difficult and expensive matter to assemble the mold ready for use. According to another well-known method the individual impressed sheet-metal parts or strips are soldered one to another at their straight edges and thus united to form the composite mold. Here also the same disadvantages exist. The necessary durability or resistance to bending was given to the sheet-metal composite mold made in this manner of several individual parts by arranging an edge-roll having a wire insertion or by providing a special iron frame; by means of such a frame the bottom of the composite mold was simultaneously to be bent hollow, thus enabling the air required for cooling to enter at the bottom.

Now the composite mold forming the subject-matter of my invention can be assembled durably and without soldering in a special manner with the most different forms of molds of any size, the top surface which is to be used for scraping off the mass being level and the entire composite mold having a neat appearance. When making my improved composite mold, neither the depth of the impressed molds nor the periphery of the same is limited, and also the mold-plate in which the individual molds are inserted in a special new manner can be unlimited in size. Further, the plate is cut so large that its outer edges can be turned over once or more frequently in order to form a firm and rigid frame. Therefore my composite mold requires no special iron frame which may become loose owing to blows or heat.

One constructional form of my improved composite mold is represented by way of example in the accompanying drawing.

In said drawing:—Figure 1 is a top plan view of the composite mold comprising inserted molds, and Fig. 2 is a vertical section in the plane $x$—$y$ in Fig. 1; Fig. 3 is a top plan view of part of the stamped metal plate, and Fig. 4 is a vertical longitudinal section through the latter, whereas Fig. 5 shows an individual mold in section, Fig. 6 the corresponding aperture in the metal plate, and Fig. 7 the combination of the mold with the plate.

Referring to the drawing, when making the composite mold the suitably large metal plate $a$ is stamped or cut out in suitable manner at the places at which the individual molds are to be inserted and the edges of the apertures thus formed are turned over to form rims $b$ having inwardly bent edges $c$. The molds $d$ to be inserted are impressed individually from special pieces or disks of sheet metal and each disk is of a size corresponding to the aperture of the plate $a$. The edge of each disk is turned down to provide a flange $e$, which fits in the bent edge $c$ of the plate $a$, see Figs. 5 and 6. The mold $d$ is then inserted in the aperture in the metal plate and firmly united thereto by compressing the rims $b$, $c$ and $e$. The rims may be pressed together, as shown in Fig. 7, toward the mold or in the opposite direction, *i. e.* outwardly. In both cases owing to the parts $a$ and $d$ being fitted together there is formed on the under side of the mold a roll which, however, in consequence of the impressions or molds being framed symmetrically, in no case prejudices the appearance of the finished composite mold, and the top surface of the composite mold remains smooth and level, and consequently admits of the mass filled into the molds being scraped off unimpededly. The apertures for receiving the molds $d$ can be arranged close together on the plate $a$, namely according to the impression and form of the individual parts in each instance, in a circular, oval, rectangular or other pattern. The plate $a$ united with the molds $d$ is then bent over once or more frequently at its edges, i. e. either only at two or at all four sides, in order to form the firm supporting rims $f$ (Fig. 2) as a substitute for a special iron frame.

In my above described composite molds the insertion of individual separately-impressed molds in one preliminarily-prepared plate and the union of these molds with the latter is new and peculiar, and also it is new in such composite molds to make the stiffening and supporting frame in one piece with the composite mold by turning over the edges of the mold-plate.

I claim:—

1. A device of the character described comprising a plate having an aperture therein, said aperture being provided with a flange extending downwardly, inwardly, and then upwardly, and a mold provided with a downwardly extending flange adapted to engage within the flange on said plate.

2. A device of the class described, comprising a plate having an aperture therein, said aperture being provided with a flange extending downwardly, inwardly and then upwardly, and a disk provided with a central depressed mold portion and a flat portion surrounding said mold portion, the outer edge of said flat portion being bent down to form a flange adapted to engage within the first-mentioned flange to retain the disk within the aperture, said flanges being so proportioned that when the disk is in position the flat surface thereof will be flush with the upper surface of the plate, said flanges being folded to lock the disk in position.

In witness whereof I have hereunto set my hand in presence of two witnesses.

MAX REICHE.

Witnesses:
 WALDEMAR BROCK,
 HENRY HASPER.

---

Copies of this patent may be obtained for five cents each, by addressing the "Commissioner of Patents, Washington, D. C."